Nov. 23, 1943.   G. V. BARDET   2,334,983
CLOSING AND VACUUMIZING MACHINE FOR GLASS JARS
Filed May 11, 1942   2 Sheets-Sheet 1

INVENTOR.
GEO. V. BARDET
BY
Cook & Robinson

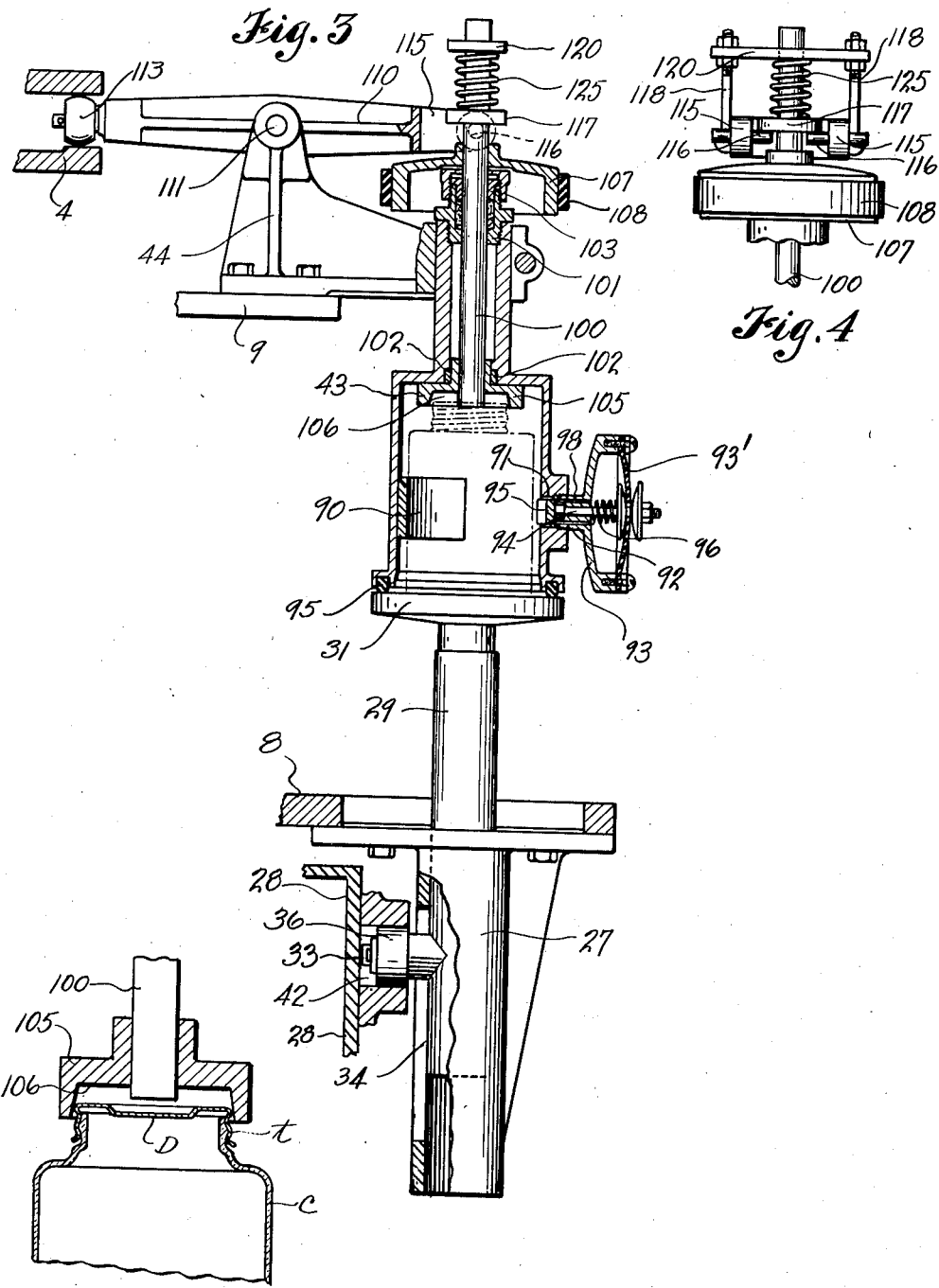

Patented Nov. 23, 1943

2,334,983

UNITED STATES PATENT OFFICE 2,334,983

CLOSING AND VACUUMIZING MACHINE FOR GLASS JARS

George V. Bardet, Berkeley, Calif., assignor to M. J. B. Company, San Francisco, Calif., a corporation of Delaware Application May 11, 1942, Serial No. 442,444

6 Claims. (Cl. 226—88)

This invention relates to machines for the vacuumizing and closing of cans and containers, and it has reference more particularly to machines for the automatic vacuumization and closing of containers that are equipped with screw tops of that character used on the ordinary types of glass jars; it being the principal object of this invention to provide a machine equipped with one or more vacuumizing chambers, and wherein means is associated with each chamber whereby a container, or jar, with its screw top loosely applied thereto, may be lifited into the chamber, the chamber sealed for vacuumization, vacuum applied in proper timing, the top then screwed down tightly to hermetically seal the container, and finally the closed, vacuumized container lowered from the chamber for delivery from the machine.

More specifically stated, the present invention relates to the adaptation of a machine of the type disclosed in U. S. Patent No. 1,874,854, issued August 30, 1932, to the vacuumization and closing of metal containers or glass jars which are equipped with screw tops; the invention residing in the provision of means for holding the containers against rotation while in the vacuumizing chambers, and in the substitution of a novel cap turning mechanism for the soldering means of the above patent.

Another object of the invention resides in the provision of means that is rendered effective by the vacuum applied to the chamber, to hold the container against turning while the top is being tightened thereonto.

Still further objects of the invention reside in the details of construction and combination of parts used in the machine for accomplishing the results stated and in their mode of operation, as will hereinafter be fully described.

In accomplishing these and other objects of the invention, I have provided the improved details of construction, the preferred forms of which are illustrated in the accompanying drawings, wherein—

Fig. 3 is an enlarged sectional detail of one of the vacuumizing chambers and the container closing units of the machine.

Fig. 4 is an end elevation of parts shown in Fig. 3.

Fig. 5 is a sectional detail, illustrating a top turning chuck and its engagement with the cap or top of a container in the tightening operation.

Figure 1:
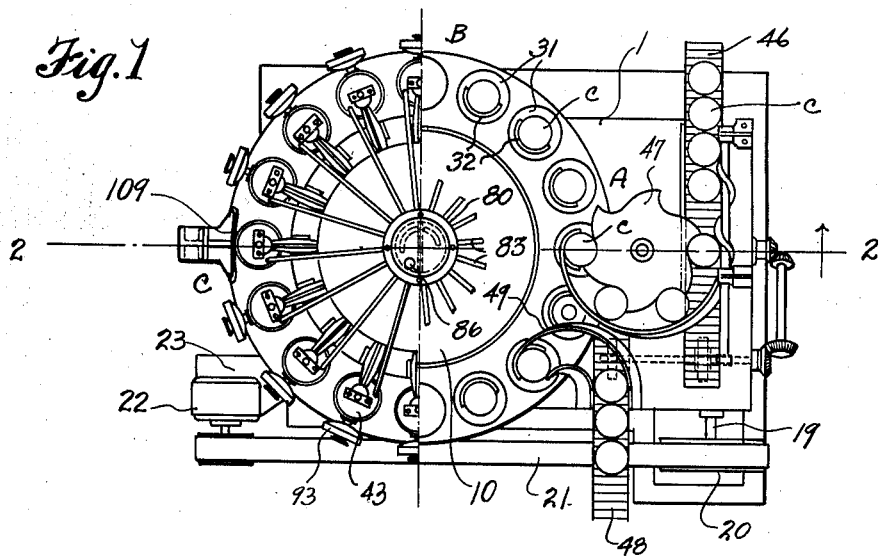
Fig. 1 is a plan view of a machine embodied by the present invention, a top portion thereof being removed for better illustration.

Referring more in detail to the drawings—

The machine herein illustrated might well be considered as a modification of the machine of the previously mentioned patent, in that it comprises substantially the same means as therein disclosed for controlling the application of vacuum; the same means for raising and lowering the containers into and from the vacuumizing chamber, and the same means for timing the entrance of containers to be vacuumized and for the discharge of the vacuumized containers from the machine. However, where the machine of the patent utilizes an electric circuit and electrically heated soldering devices for sealing the vacuumized containers, these parts in the present machine have been eliminated and a novel cap turning means has been substituted therefor. It is to be understood that the present invention anticipates that the containers to be closed may be of metal, glass, plastic or other suitable material, each equipped at its upper end with a filling opening surrounded by a threaded neck onto which neck a screw top or cap may be tightened to close and hermetically seal the container. Fig. 5 of the drawings illustrates a portion of such a container, designated by reference character C, and its closure top or cap is designated at D, and this top has the side wall portions thereof threaded as at $t$ for application to cooperating threads on the neck portion of the container. It is to be understood that, if it is necessary, suitable gaskets might be used to insure the hermetic sealing of the container when the cap is tightened into place.

The machine, as shown, comprises a base or bed plate 1, upon which a central axis or shaft 2 is vertically mounted and held against rotation by means of a supporting bearing 3. To the upper end portion of the shaft 2, a circular cam track plate 4 is fixed.

Resting on the bearing 3, and mounted by, and for rotation about the shaft 2, is a frame structure which comprises horizontal disk-like tables 8, 9 and 10, connected and vertically spaced by suitable intermediate brace members 11 and 12. Secured to the lower portion of this rotary frame, and forming the bottom member thereof, is a bevel gear wheel 13, coaxial of shaft 2 and adapted to be driven by a pinion gear 14 fixed on a horizontal shaft 15. The outer end of shaft 15 is provided with a worm gear 16, here shown as enclosed within a casing 17, and a worm 18, mounted on and driven by a shaft 19, imparts motion to the worm wheel. Shaft 19, in turn, is driven by a pulley 20 that is fixed on one end thereof, and about which a driving belt 21 operates. The belt extends about and is driven by the pulley of a motor 22 mounted on a suitable bracket 23 attached to the bed plate as observed in Fig. 1.

Fixed to the lower, table-like disk 8 of the rotary frame structure, at equally spaced intervals, are a plurality, here shown to be sixteen, of tubular guide brackets 27 which extend downwardly from the peripheral portion of the table adjacent the outside of a stationary, cylindrical housing 28 mounted on the bed plate, coaxial of shaft 2. Slidably mounted in each of these tubular brackets is a vertically movable guide shaft 29 on the top end of which is fixed a circular pad or table 31 upon which a container, to be vacuumized and closed may be placed. On each pad 31 is a centering flange 32 whereby the container, when mechanically placed on the pad, will be centered relative thereto and axially alined with the vacuumizing chamber which is to receive it, as presently explained.

Extending laterally from the lower end of each guide shaft 29 is a stud 33. These studs pass outwardly through longitudinal slots 34 in the guide brackets and at their ends mount rollers 36 that are arranged to follow within a cam track 42 that is fixed about the cylindrical housing 28, and thus, by reason of appropriate shaping of the cam track, effects reciprocal vertical travel of the shafts 29 as is necessary to raise and lower the containers into and from the vacuumizing chambers, which will now be described.

Alined above each pad 31 is an open bottom casing, or chamber 43, rigidly mounted upon the rotary frame by means of a bracket 44. The lower edge of each chamber is flanged and is provided about the entrance opening with a conformable gasket 45. The arrangement of parts so far described is such that, as the carrier frame rotates, each pad, on reaching a definite position, will be raised to lift the container thereon into the alined chamber, and the pad then moved into sealed engagement with the chamber gasket, thus hermetically sealing the chamber; it being understood, of course, that the containers to be closed are of uniform size and after being properly placed on the pads, will be lifted into the chambers, and definitely located therein.

Devices are provided for automatically placing and centering the containers upon the pads as they move into a certain location, and likewise, means is provided for removing the vacuumized containers from the machine upon completion of the closing operation.

Briefly stated, the container placing means comprises a driven conveyor belt 46 and a rotating star wheel 47 which is synchronized to deliver containers from the belt onto the pads 31 as they successively move through the receiving station. The removing means comprises an outgoing conveyor belt 48 onto which the closed containers are deflected from the pads by contact with a stationary guide plate 49.

The means herein provided for vacuumizing the chambers 43 after the containers have been located therein, and after the chambers have been closed, but prior to the operation of tightening the tops onto the containers, is as follows: Located centrally above the machine, coaxial of shaft 2, is a master valve through which all vacuumizing chambers are connected with a source of vacuum. This valve comprises a closed, inner housing 70 of cylindrical form mounted coaxially upon the upper end of the shaft 2, just above the plate 10, by any suitable means. While it is not absolutely necessary, it is preferred that the master valve here used be like that of the patent previously mentioned which shows that the housing 70 is divided diametrically by a partition 73 to form two separate compartments, 74 and 75, which are connected respectively by pipes 76 and 77 with a source of vacuum, preferably of considerable volume. Fitted about the housing 70, so that it may rotate thereon, is a valve casing 80 of cylindrical form having its wall portions overlapping the cylindrical wall portions of the inner housing in a close joint, and having a base portion 81 underlying the housing 70 and fixed to the plate 10 so that this casing rotates with the frame of the machine.

Figure 2:
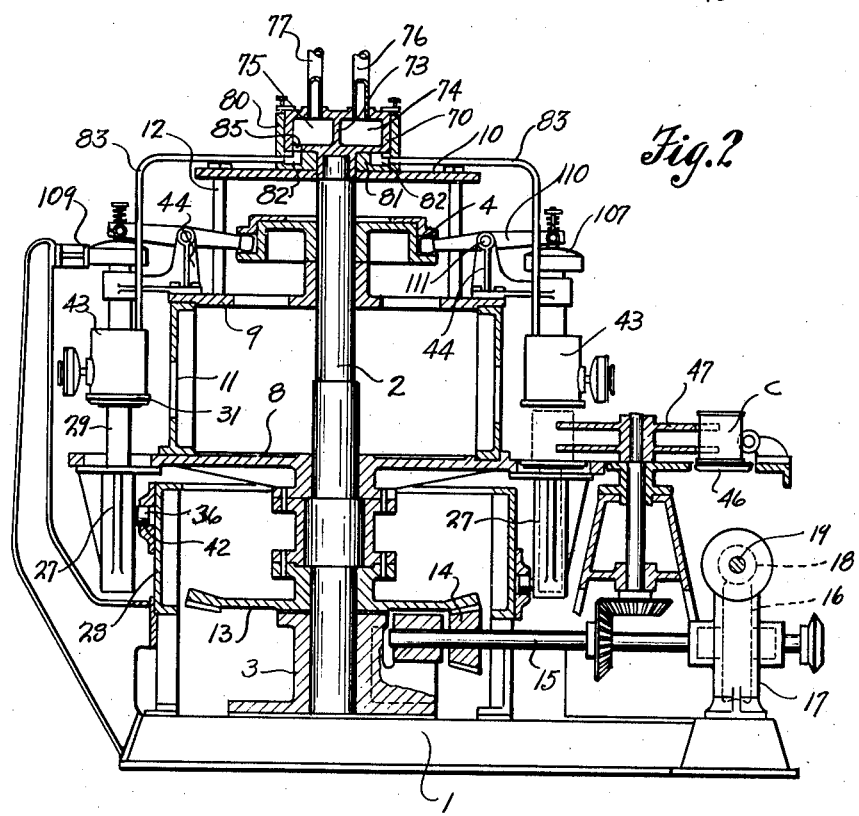
Fig. 2 is a horizontal, sectional view of the machine, taken substantially on the line 2—2 in Fig. 1.

Formed in the base portion 81, at equally spaced intervals, and corresponding in number to the number of vacuumizing chambers of the machine, are radially directed channels 82 which, at their inner ends are directed upwardly and open to the inner face of the base 81 at equal distances from the axial center of the valve so that, as the valve casing revolves, these openings will be brought successively into registration with arcuate slots 84 and 85 formed in the bottom wall portions of the chambers 74 and 75 and into registration with an air inlet port 86 formed vertically through the housing 70. Leading from the outer ends of the channels 82 are pipes 83 which connect with the various vacuumizing chambers 43. The pipes 87 enter these chambers 43 through their top walls as shown in Fig. 2.

In operation, the incoming containers with tops loosely screwed thereon for vacuumization, and requiring only about one-half turn to make them tight, are delivered successively onto the pads 31 as the frame revolves about shaft 2. As each container reaches the point A in Fig. 1, its pad is raised into contact with the sealing gasket of its corresponding vacuumizing chamber to locate the container therein and to seal the chamber.

After the chamber has thus been sealed, the inner end of the channel 82 in the valve casing 80 with which the tube 87 leading from this particular chamber connects, is brought into registration with the valve slot 84 and in this way connection is provided through the chamber 74 of the master valve and the pipe 76 with the source of vacuum. The chamber and container are thus vacuumized and the container is then ready for sealing. Further rotative movement of the machine and the valve casing brings the channel 82 into registration with the slot 85 in the bottom wall of the compartment 75, and thus connection is maintained with the source of vacuum through this compartment and the pipe 77. During the time the channel 82 travels from the final end of slot 84 to the final end of slot 85, that is, through the interval designated from B to C in Fig. 1, the sealing operation takes place. This sealing operation is effected by tightening the screw top onto the container, and to effect this, it is required that the container be held against possible rotation while the cap is rotated.

In order that the container may be held against rotation as required, there is provided within the chamber, at one side thereof, a cylindrically curved pad 90 fixed to the chamber wall. Directly opposite the pad 90, in each chamber, there is provided an opening 91 into which the tubular mounting shank 92 of a hollow housing 93 is threaded. The housing is circular, and across its outer face is fixed a flexible diaphragm 93'. A rod 94 is fixed at its outer end centrally to the diaphragm, and extends inwardly through the tubular mounting stem of the housing 93 and into the chamber opening, and is there equipped with a shoe or pad 95. A coiled spring 96 located about the stem, bears against the base of housing 93 and outwardly against the diaphragm to normally hold it flexed outwardly. Air passages 98 are formed in the base of the housing to connect its chamber with the vacuum chamber through the opening 91.

Assuming that a container has been lifted into a chamber 43 and the chamber has been sealed by contact of the container lifting pad 31 with the sealing gasket provided about the mouth of the chamber, it will be understood that when vacuum is applied to the chamber, this will be transmitted through the opening 91 to the housing 93, thus causing the flexible diaphragm to be flexed inwardly. This action will cause the shoe 95 to be pressed into tight engagement with the container wall, and the container thus to be clamped between the pad 90 and the shoe and thereby held against rotation.

While the container is being held against rotation, its screw top is tightened. The means for tightening the screw top that is associated with each chamber comprises a vertical shaft 100 that extends coaxially within the tubular mounting neck with which the chamber is equipped, and somewhat beyond the upper end of the neck. Within the upper and lower end portions of this neck portion, bushings 101 and 102 are fitted which guide and support the shaft, while a suitable packing gland 103 seals the neck at its upper end. On the lower end of the shaft 100 is a chuck 105 having a downwardly opening, conical socket 106. On downward shifting of the shaft, by means presently to be described, the socket will receive the container top therein causing the tapered walls of the socket to frictionally engage the periphery of the screw top for the tightening operation. On the upper end of the shaft 100, a wheel 107 is fixed, and this has a friction tire 108 of rubber or other suitable material, to engage in rolling contact with an arcuate shoe 109, supported from a stationary part of the machine and of such extent as to give the shaft sufficient rotation to tighten the screw top.

The means provided for lowering the shafts 100 of the several chambers to engage the chucks with the screw tops comprises, for each chamber, a cam lever 110, pivoted intermediate its ends, as at 111, on the chamber mounting bracket, and extending radially of the machine. Each lever is provided with a cam follower roller 113 at its inner end contained in the cam track 4. At their outer ends, the levers each are formed with yoke arms 115—115 extended to opposite sides of the corresponding shaft 100. These arms are equipped with pins 116 extended inwardly and engaged with the under side of a collar 117 that is fixed on the shaft. Bolts 118 extend upwardly from the yoke arms, and at their upper ends mount a cross bar 120 through which the upper end portion of shaft 100 slides. A coiled spring 125, is located about the shaft and bears upwardly against the cross bar and downwardly against the collar 117.

The cam track 4 is so shaped that at proper location of each chamber in the rotation of the machine after a container has been placed therein, the corresponding cam lever will be actuated to move its outer end downwardly, thereby permitting the spring 125, pressing downwardly on the collar 117, to move the shaft 100 downwardly to effect the engagement of the chuck with the screw top of the vacuumized container. Immediately following the engagement of the screw top by the chuck, the friction wheel 107 on the shaft engages the segment 109 to impart that rotative movement to the shaft whereby the screw top will be tightened on the container. The turn of the shaft is somewhat greater than that required for the complete tightening of the screw top and as soon as the top becomes tight, there will be slippage between the top and the chuck. This may be regulated by the spring tension applied. After the screw top has been tightened, the cam action causes the outer end of the lever 110 to be moved upwardly, thereby causing the pins 116 to engage the collar 117 and lift the shaft against the pressure of the coiled spring, thus freeing the chuck from the screw top.

It will be mentioned that the action of each lever 110 is such that when it is moved to lower the shaft 91, the pins 116 move somewhat in the clear of the collar 117 so that the spring 125 will maintain a desired frictional pressure between the chuck and the screw top.

Assuming that the machine is so constructed, it is quite readily apparent that the holding of the containers in the chambers will be automatically effected coincident with the application of vacuum to each chamber and that the operation of tightening each screw top may be accurately timed to follow a predetermined vacuumizing period and this tightening operation, by reason of the provision for slippage, between the screw top and chuck, insures against breakage or detrimental results that might be encountered should there be no provision for such slippage.

Machines of this character may be equipped with one or more of such vacuumizing and closing units, and while I have described and illustrated a machine of specific form of construction, it is to be understood that machines of various type other than this shown might be equipped with the present means without departing from the spirit of the invention.

Having thus described my invention, what I claim as new therein and desire to secure by Letters Patent is:

1. In a vacuumizing and closing machine for screw top containers, a vacuumizing chamber adapted to receive a container, with screw top loosely applied thereto, for vacuumization and final tightening of the top, means for applying vacuum to the chamber for the vacuumization of the container, a yieldably movable clamp member, a flexible diaphragm associated with the chamber acted on by vacuum therein to move the clamp member against the container to hold it against rotation and a rotatable member in the chamber, and means for moving said member into contact with the container top and for rotating it to cause the top to be tightened to seal the vacuumized container.

2. In a vacuumizing and closing machine for screw top containers, a vacuumizing chamber, means for locating a container in the chamber for vacuumization and the final tightening of its top, means for effecting vacuumization of the chamber for the vacuumization of the container therein, means energized by the vacuumization of the chamber to hold the container therein against rotation, rotatable means in the chamber movable into engagement with the loosely applied container top for tightening it to thus hermetically seal the container, and means for rotating said rotatable means and for moving it into and from engagement with the container top.

3. In a vacuumizing and closing machine of the character described, an open ended vacuumizing chamber, means for moving a container into the chamber through said open end and for sealing the chamber, means for vacuumizing the chamber to effect the vacuumization of a container moved thereinto, a yieldingly movable clamp member in the chamber, means operable incident to the vacuumizing of the chamber to cause said clamp to be moved into contact with the container to hold it against rotation, a chuck movable into frictional contact with the container top for tightening the latter, and means for rotating the chuck to effect the turning of the top and its tightening on the container.

4. In a vacuumizing and closing machine for screw top containers, a vacuumizing chamber open at its lower end, a pad below the chamber on which a container to be vacuumized and closed may be placed, means for vertically actuating the pad to lift a container placed thereon into the chamber and to seal the chamber; a source of vacuum, a valve mechanism connected with the chamber and with the source of vacuum, and operable between positions whereby to connect the chamber with said source of vacuum for the vacuumization of an enclosed container and to open the chamber to atmospheric pressure, a clamp means associated with the chamber and energized by and incident to the application of vacuum to hold the container against rotation, a chuck disposed coaxial of the container top, means for moving the chuck into frictional contact with the container top for a tightening operation, means for rotating the chuck to tighten the top and means for disengaging the chucks from the top after it has been tightened.

5. In a vacuumizing and closing machine for screw top containers, a vacuumizing chamber adapted to receive a container thereinto with its top loosely applied, means for applying vacuum to the chamber for the vacuumizing of the enclosed container, a closed housing in communication with the vacuumizing chamber and having a flexible diaphragm in a wall thereof adapted to move with the application and release of vacuum, and a clamp member connected with the said diaphragm and movable thereby with the application of vacuum to grip the container, and means for engaging and tightening the top on the container while it is so gripped.

6. In a vacuumizing and closing machine for screw top containers, a vacuumizing chamber, means for disposing a container therein, with top loosely applied, for vacuumization, means controlled by vacuum in the chamber for holding the enclosed container against rotation, means for applying vacuum to the chamber, a chuck adapted to be frictionally engaged with the top for tightening it, a shaft coaxial of the chuck and mounting in the container, means for rotating the shaft, yieldable means acting against the shaft to move it endwise to cause the chuck to frictionally engage the screw top for a tightening operation, and means for lifting the shaft to disengage the chuck from the container top after the tightening has been accomplished.

GEO. V. BARDET.